United States Patent
Andersson et al.

[11] Patent Number: 5,921,105
[45] Date of Patent: Jul. 13, 1999

[54] COOLING UNIT

[75] Inventors: Sven-Erik Andersson, Trosa; Robert Sagulin, Saltsjö Boo, both of Sweden; Frank G. Schaper, Siegen, Germany

[73] Assignee: Electrolux Siegen GmbH, Siegen, Germany

[21] Appl. No.: 08/993,453

[22] Filed: Dec. 18, 1997

[30] Foreign Application Priority Data

Dec. 23, 1996 [DE] Germany .......................... 196 54 261

[51] Int. Cl.⁶ .......................... F25B 37/00; F25B 15/00
[52] U.S. Cl. .............................................. 62/494; 62/476
[58] Field of Search .......................... 62/476, 484, 487, 62/490, 494, 101

[56] References Cited

U.S. PATENT DOCUMENTS

| | | | |
|---|---|---|---|
| 2,243,903 | 6/1941 | Hintze | 62/490 |
| 3,775,996 | 12/1973 | Blomberg | 62/490 |
| 3,782,134 | 1/1974 | Meess et al. | 62/476 |
| 3,802,219 | 4/1974 | Bloomberg et al. | 62/452 |
| 3,851,497 | 12/1974 | Bloomberg et al. | 62/452 |
| 4,458,504 | 7/1984 | Wallgren et al. | 62/490 |
| 5,499,516 | 3/1996 | Andersson et al. | 62/494 |
| 5,636,527 | 6/1997 | Christensen et al. | 62/476 |

*Primary Examiner*—William Doerrler
*Attorney, Agent, or Firm*—Pearne, Gordon, McCoy & Granger LLP

[57] ABSTRACT

In a cooling unit for an absorption circuit, an absorber, a generator, a condenser, and an evaporator are provided. The absorber is built by at least two mutually connected profiled plates which form lines and ports for connecting the generator to the evaporator. The lines are guided in a meander pattern and two adjacent lines are mutually connected through at least one opening. The absorber can be pivoted by an at least partial inclination of the lines with respect to horizon from a neutral position by an axis extending in parallel to the plate plane by more than 3°, preferably more than 6°, without the operation of the cooling unit being impeded by the rotation of the plates. This permits the cooling unit to be used on mobile vehicles and boats where frequent inclined positions occur.

15 Claims, 5 Drawing Sheets

COOLING UNIT

BACKGROUND OF THE INVENTION

The invention pertains to a cooling unit for refrigerators in particular, which are to be operated without noise and for which a heat source is to be used as drive.

From U.S. Pat. No. 3,782,134, an absorption cooling system is known in which almost all components are built in two plates one put on top of the other, in which lines for the absorber, the generator, the condenser and the evaporator are provided for. This results in easy manufacture of the absorption cooling system, but has the drawback that the efficiency of the cooling circuit is reduced. On the warm side of the circuit in particular, losses occur, because in the plates thermal conduction takes place between the individual components, the generator is not built as efficient double-pipe generator and only a heat exchanger with lower efficiency is provided for between the generator and the absorber. The rigidly assembled absorption cooling system furthermore has to be kept in a given position for operation, for avoiding banking of liquid in one of the lines. Use of this system in a vehicle parked on inclined area or in a boat in which inclination may occur, too, thus is not appropriate.

In addition, it is known from EP 0 642 762 to operate a cooling unit using an absorption circuit in which the absorber is formed by two plates arranged in parallel in which lines are formed. In the absorption circuit rich solution at first is supplied on the bottom side of the absorber to a heat exchanger and subsequently to a generator. $NH_3$ vapor is expelled from the generator built as double pipe and is supplied to a condenser. The condensate thereafter is evaporated in an evaporator, therein heat being abstracted from the environment for cooling purposes. The vaporous medium subsequently is supplied to the absorber where it again is absorbed by the liquid supplied from the generator. It is true that the described system for standard operation has a comparatively good efficiency in terms of energetic, however, as soon as the cooling unit is inclined the danger exists that the liquid contained in the absorber collects and the liquid is banked in the horizontally arranged lines such that a siphon is created. Such banking of liquid severely impedes operation of the cooling unit and subsequently reduces efficiency of the system. Moreover, the system shown in EP 0 624 762 is of expensive construction, since the absorber, the generator, the condenser and the evaporator each are built separately and, therefore, have to be assembled in a complicated installation process.

SUMMARY OF THE INVENTION

It is, therefore, the main object of the present invention to create a cooling unit which can also be operated when the cooling unit has a slightly inclined position, without the efficiency being reduced notably therein. Furthermore, the cooling unit is to be of simple construction and is to show an efficiency as high as possible.

By forming the absorber, the absorber container and the condenser each of at least two profiled plates connected to one another, these two components can be manufactured quickly and simply, wherein due to the partial inclination of the lines pivoting by more than 3°, preferably more than 6°, about an axis extending perpendicularly to the plate plane is possible, without banking of liquid in the absorber or the condenser impeding operation of the cooling unit. Since the cooling system is not sensitive to inclinations, it can also advantageously be used for mobile purposes, like in vehicles or boats. In addition, the cooling unit permits operation with high efficiency, provided that a separate cooker having an heat exchanger connected in front thereof is connected to the condenser and the absorber. Due to the plate-shaped embodiment of the absorber, the absorber container and the condenser, the front-to-back size can be kept low.

In a preferred embodiment of the invention the insensitivity to inclination of the absorber is achieved in that the lines have v-shaped sections, the surface of the absorber becoming particularly large because, of a meander-shaped embodiment of the lines. If the lines of the absorber therein comprise an opening to the adjacent line in the respectively deepest positions, no liquid banking will occur, as long as the inclination of the absorber does not deviate exceeding the inclination of the v-shaped leg with respect to horizon. But even in such case hindrance by liquid banking is reduced by the openings in the lines.

Corresponding to a preferred embodiment, the walls of the lines of the absorber are provided with grooves so that capillary effects responsible for a particularly good distribution of the liquid on the walls of the absorber will occur on the walls, this causing good heat transfer and thus high efficiency. Preferably, the grooves in a manner known per se are arranged in different directions having an angle of inclination.

Preferably, the absorber, the absorber container and the condenser together are integrally formed by two plates so that the cooling unit can be manufactured in particularly simple and compact manner. Therein, no additional thermal losses due to thermal conduction will occur, since the absorber and the condenser are kept on approximately the same temperature levels.

In a preferred embodiment of the present invention, the condenser is built as serpentine pipe condenser with liquid separator so that the condensate created in the condenser does not impede transfer of heat to the vapor. For achieving a surfaces accessible for heat transfer, being as large as possible, the condenser comprises a channel in meander pattern, whose turns are formed essentially vertically and a second channel located below said first channel, wherein a plurality of connections is provided for liquid separation between said first and second channels. Even in case of inclination of the condenser the liquid collected in the second channel does not impede heat transfer in the first channel. Preferably, a port for a gaseous medium is provided for on the one end of said first channel, the vertical extension of the turn of said first channel enlarging in direction to the other end, wherein said second channel is formed extending in oblique downward direction from the end showing the port to horizon. This results in that the condensate collected in the second channel can flow out downwardly.

A particularly compact construction of the cooling unit can be achieved by providing for an evaporator whose lines extend essentially in parallel to the plate plane of the absorber, between the condenser and the absorber. Therein, the lines of the evaporator mostly are guided within a cooling chamber insulated with respect to the warmer parts of the cooling unit. For keeping the losses of the cooling unit on a level as low as possible, a generator is provided for between the absorber and the condenser, said generator and the evaporator being arranged on two opposing sides of the absorber.

The cooling unit can be manufactured in particularly simple manner by welding the plates of the absorber and the condenser to one another.

LIST OF FIGURES

The invention will now be described in more detail with reference to the attached drawing. In the drawing.

DETAILED ACCOUNT OF WORKING EXAMPLE OF THE INVENTION

Figure 1:
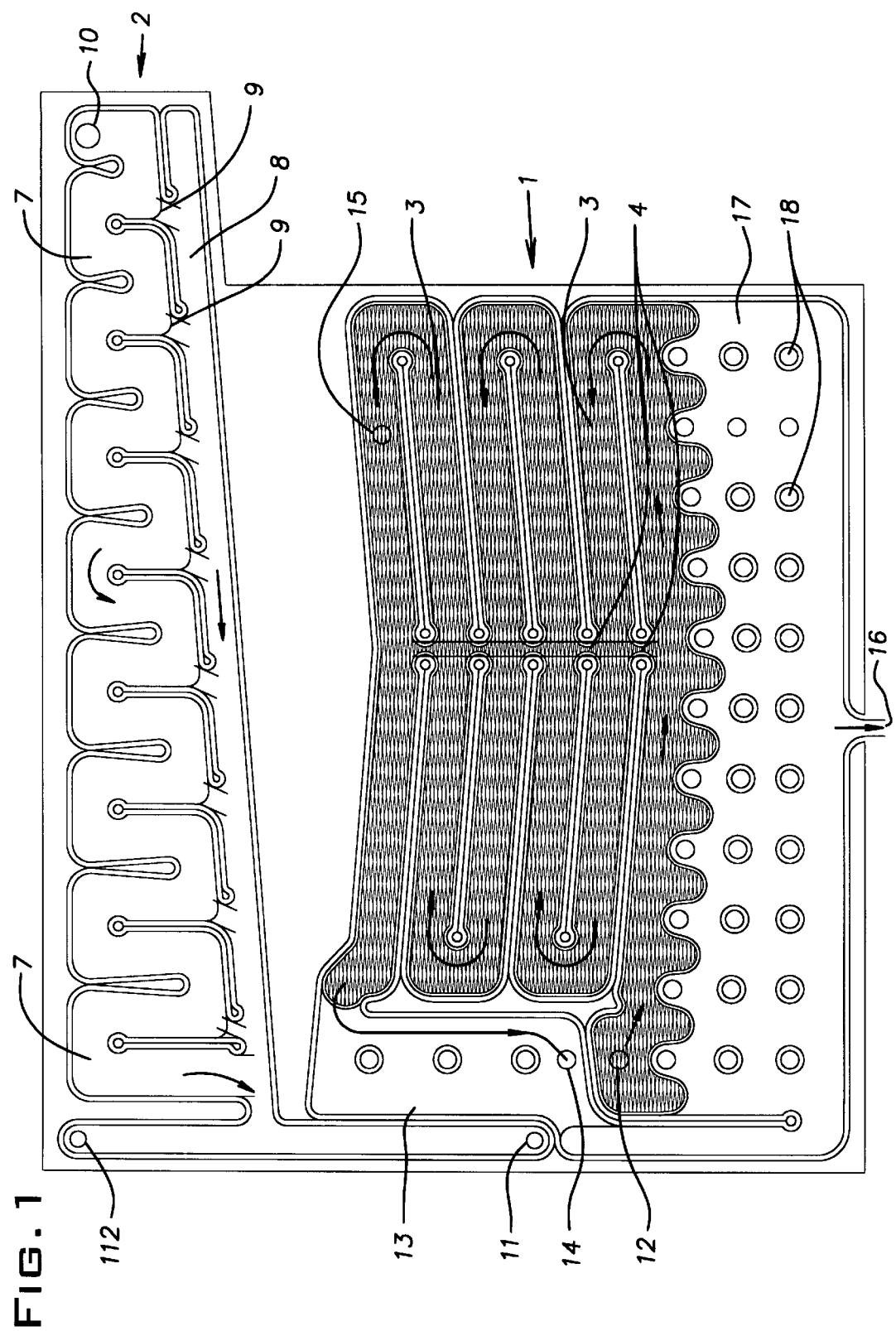
FIG. 1 shows a sectional view through the absorber and the condenser of the cooling unit.
Figure 2:
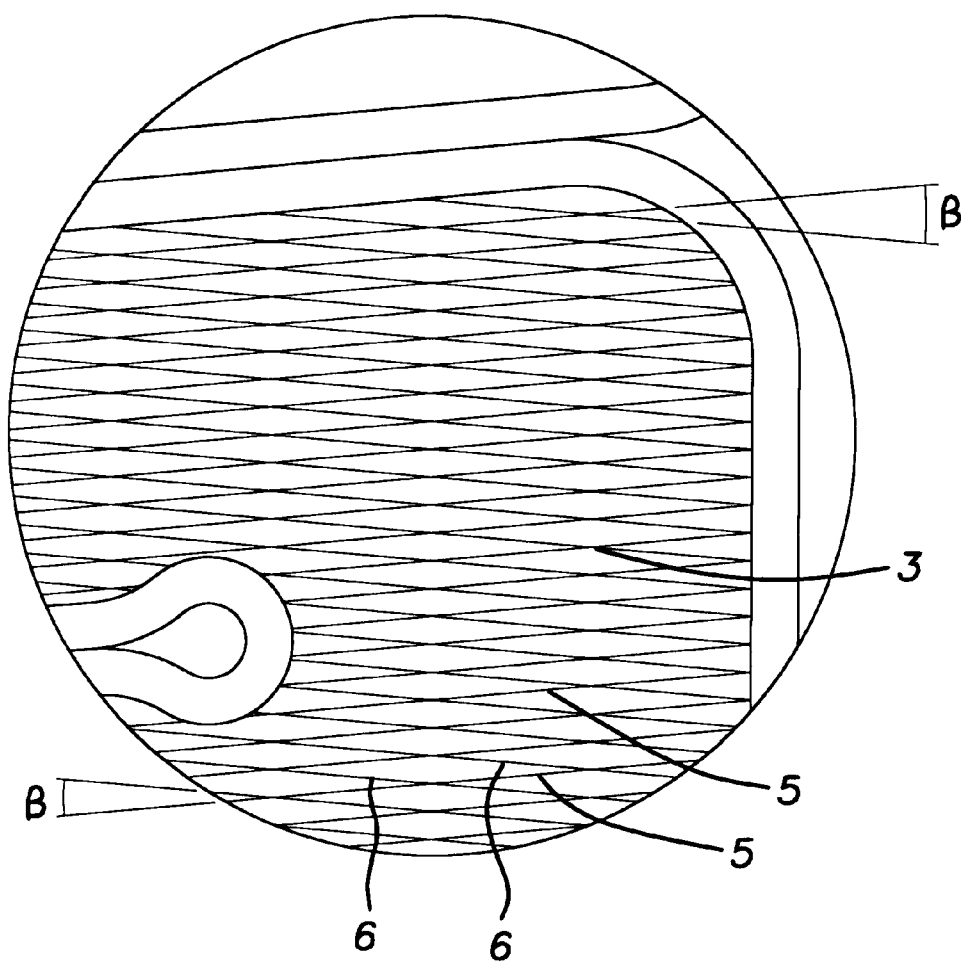
FIG. 2 shows an enlarged partial view of the line of the absorber of FIG. 1.
Figure 3:
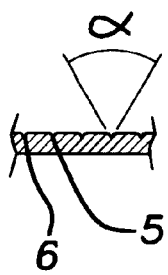
FIG. 3 shows a section along line A—A of FIG. 2.

The cooling unit shown in FIGS. 1 to 3 comprises an absorber 1 and a condenser 2. Said absorber 1 and said compressor 2 therein are formed by two plates positioned one on top of the other, which are welded to one another by laser beam welding. It also is possible to build said condenser and said absorber separately from one another by two plates one put on top of the other.

Said absorber 1 comprises v-shaped lines each of which is guided in meander pattern one on top of the other. In the deepest position of each v-shaped line 2 an opening 4 is provided for which leads to an adjacent line 3. The walls of said lines 3 are provided with grooves 5 and 6 in order to increase capillary effects on the walls. Said grooves therein are formed in wedge-shaped manner with an angle a of 60° to the walls and they have a depth of 0.3 mm. The distance between two grooves running in parallel amounts to appx. 1.5 mm. The walls are provided with grooves extending in two different directions. In FIG. 2 said grooves 6 extent in upward oblique direction by an angle b of 5°, whereas said grooves 6 extent in downward oblique direction by an angle b of 5°.

A condenser 2 comprising a first channel 7 extending in meander pattern and a second channel 8 located therebelow is arranged above said absorber 1. Connections 7 serving as liquid separators are disposed between said first channel 7 and said second channel 8. On the one end of said first channel 7 a port 10 for a gaseous medium is provided for, which medium is guided through the turns in meander pattern. The length of said turns therein increases in passage of said condenser 2. Correspondingly, said second channel 8 is formed extending obliquely in downward direction to horizon so that sorted liquid is removed in downward direction due to gravity. On the other end of said condenser 2 a liquid collector is provided for, on whose lower end a port 11 to an evaporator is provided for and on whose upper area a port 112 for a pressure compensation pipe is arranged.

The vapor produced in said evaporator is guided into said absorber 1 via a port 12. The vapor therein passes through said meander-shaped lines 3 and is absorbed by the liquid contained in said absorber 1. At the end of said lines 3 of said absorber 1 a pre-cooler 13 for the assistant gas purified from refrigerant is provided for, in whose lower area a port 14 leading to the evaporator is disposed. The port 112 communicates with said port 12 via said pressure compensation pipe.

Said absorber 1 in its lower area comprises a reservoir 17 in which spacers 18 are provided for spacing the two plates with respect to one another. On the bottom side of said reservoir 17 an outlet 16 is provided for the rich solution. In the upper area of said absorber 1 a port 15 is arranged for poor solution to be introduced.

Figure 4:
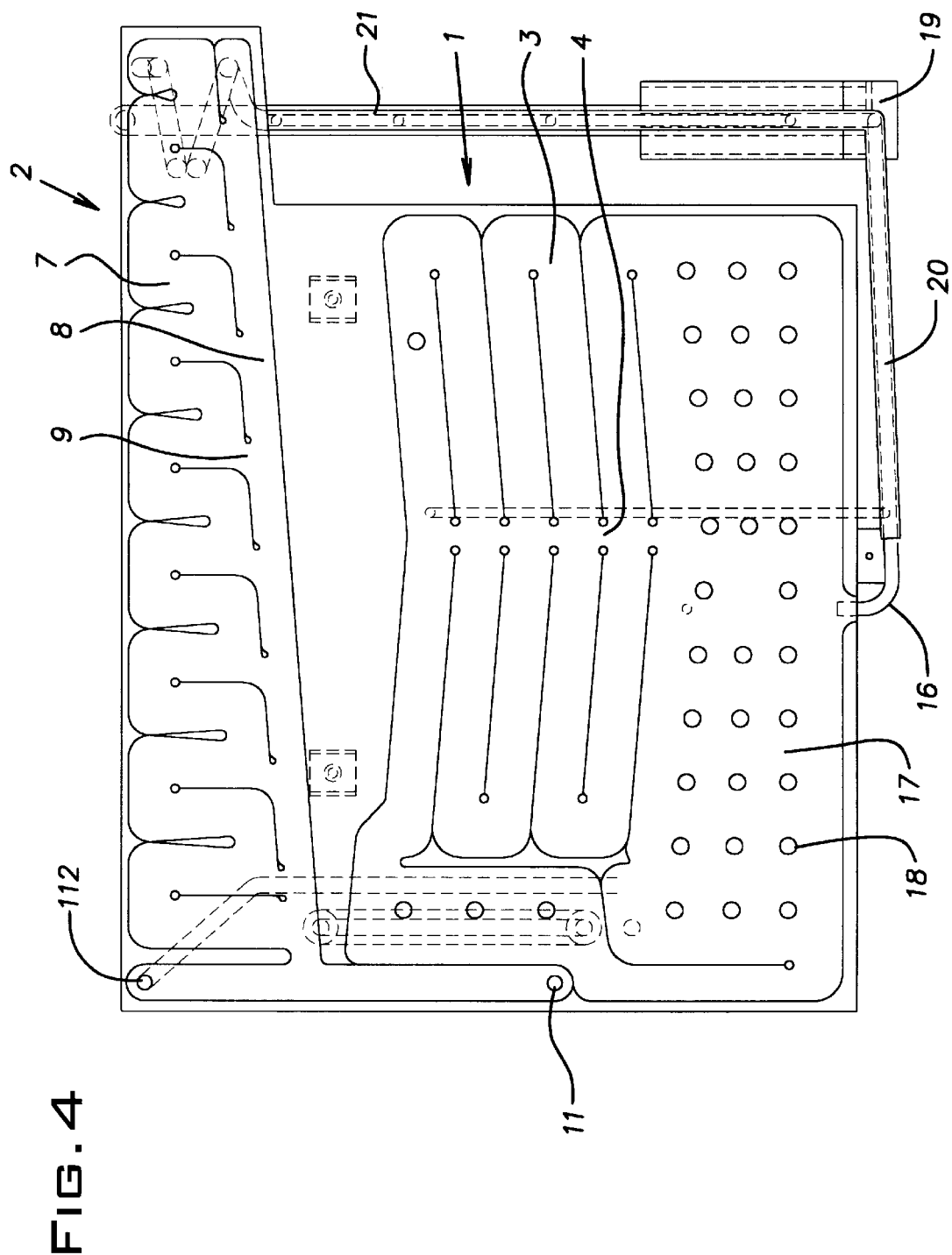
FIG. 4 shows a schematic sectional view through the cooling unit.
Figure 5:
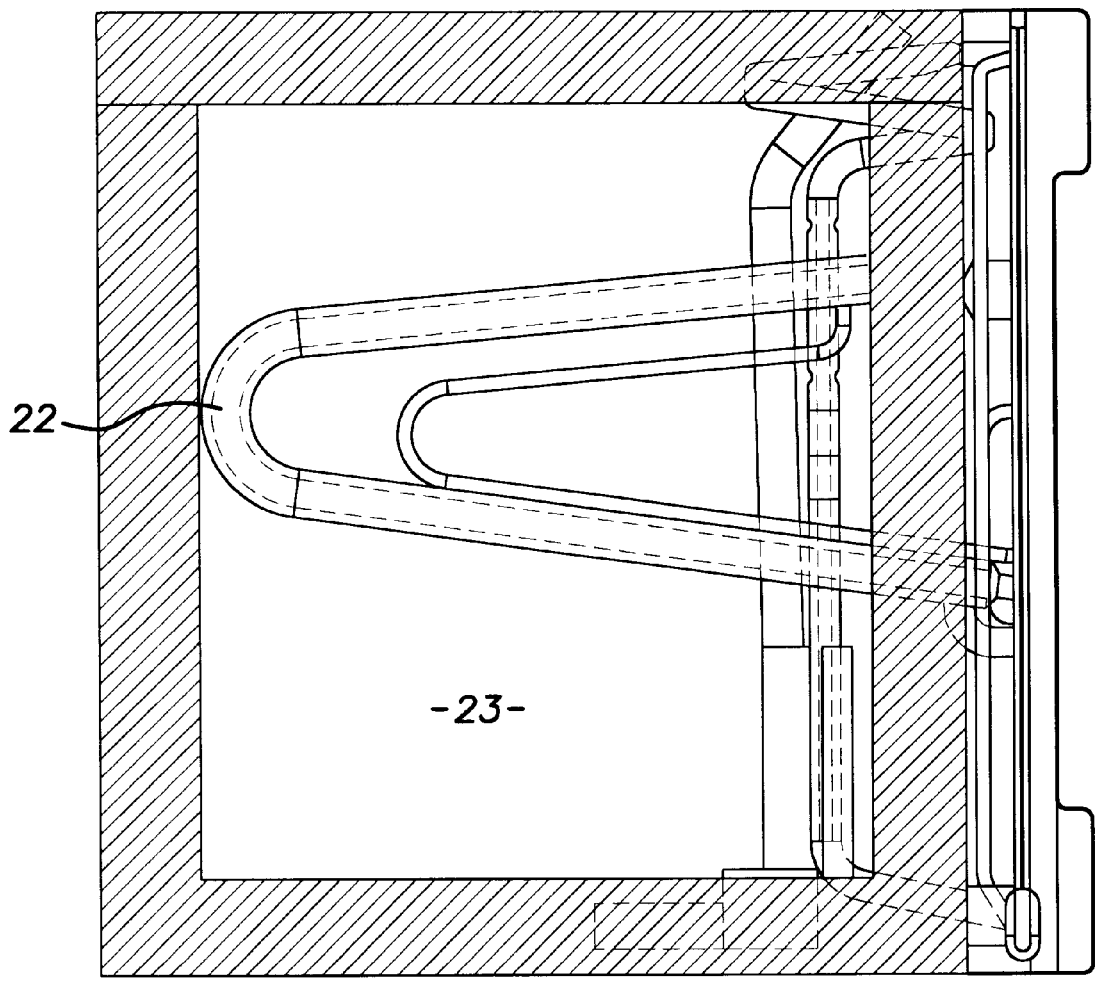
FIG. 5 shows a side view of the cooling unit of FIG. 4 in connection with a cooling chamber.
Figure 6:
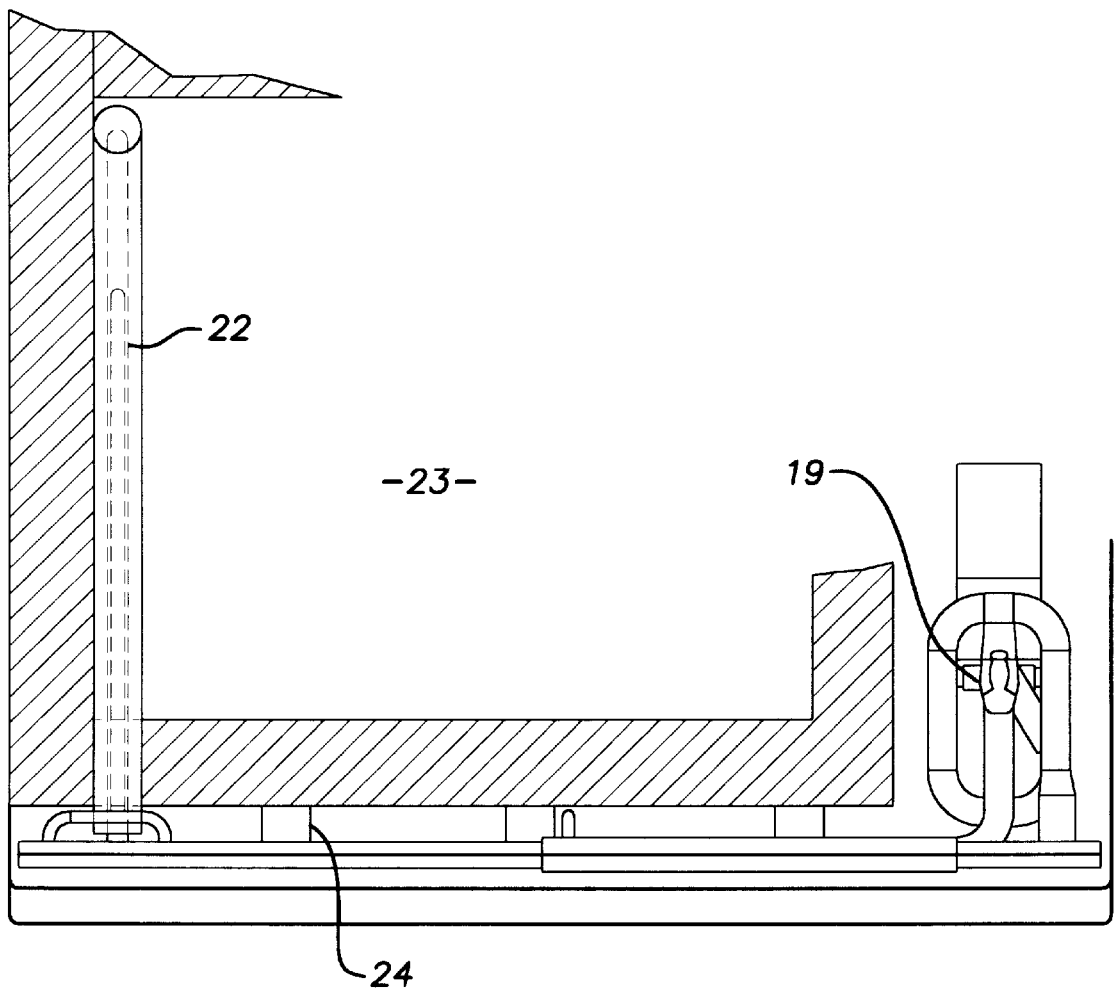
FIG. 6 shows a top view onto the cooling unit of FIGS. 4 and 5.

In FIGS. 4 to 6, the cooling unit is shown in assembled condition, said cooling unit being used for cooling a room. Said outlet 16 of said reservoir 17 of said absorber 1 leads to a double-pipe heat exchanger 20 in which heat is supplied in the rich solution. The rich solution thus heated is guided to a generator 19 in which the refrigerant is expelled and supplied to said condenser 2 via said port 10 through a line 21. The poor solution produced in said generator 19 is guided to said absorber 1 in an upper area via said port 15 through said double-pipe heat exchanger 20.

The vapor condensed in said condenser 2 is supplied to the evaporator 22 via said port 11. Said evaporator 22 therein is built in perpendicular to the plate plane of said absorber 1 and said condenser 2 and enters a cooling chamber 23 through a rear wall. Said evaporator 22 thus cools said cooling chamber 23, the produced vapor being guided to said absorber 1 via said port 12. As can be seen from FIG. 6, the plate-shaped unit formed by said absorber 1 and said condenser 2 is fixed to the rear wall of said cooling chamber using connecting members 24. In the described embodiment, the cooling unit is operated using an aqueous ammonia, hydrogen being used as assistant gas.

What is claimed:

1. A cooling unit for an absorption circuit, comprising an absorber (1), a generator (19), a condenser (2) and an evaporator (22), said absorber (1) being formed by at least two profiled plates being mutually connected, said at least two plates forming lines and ports (10, 11, 12, 15, 16) for connection to said generator (19) and said evaporator (22), said lines being guided in meander pattern and two adjacent lines being mutually connected by at least one opening, wherein said lines at least partly have an inclination with respect to horizon so that said absorber (1) is pivotable from a neutral position about an axis extending perpendicularly to a plate plane by more than 3°, without the operation of said cooling unit being impeded by the rotation of the plates.

2. A cooling unit for an absorption circuit, comprising an absorber (1), a generator (19), a condenser (2) and an evaporator (22), said absorber (1) being formed by at least two profiled Plates being mutually connected, said at least two plates forming lines and ports (10, 11, 12, 15, 16) for connection to said generator (19) and said evaporator (22), said lines being guided in meander pattern and two adjacent lines being mutually connected by at least one opening, wherein said lines at least partly have an inclination with respect to horizon so that said absorber (1) is pivotable from a neutral position about an axis extending perpendicularly to a plate plane by more than 3°, without the operation of said cooling unit being impeded by the rotation of the plates, said lines (3) of said absorber (1) comprise at least one v-shaped section, and wherein individual lines (3) therein are disposed one on top of the other.

3. A cooling unit for an absorption circuit, comprising an absorber (1), a generator (19), a condenser (2) and an evaporator (22), said absorber (1) being formed by at least two profiled plates being mutually connected, said at least two plates forming lines and ports (10, 11, 12, 15, 16) for connection to said generator (19) and said evaporator (22), said lines being guided in meander pattern and two adjacent lines being mutually connected by at least one opening, wherein said lines at least partly have an inclination with respect to horizon so that said absorber (1) is pivotable from a neutral position about an axis extending perpendicularly to a plate plane by more than 3°, without the operation of said cooling unit being impeded by the rotation of the plates, an opening (4) to adjacent line (3) is provided for in the deepest position of a v-shaped section in said line (3) of said absorber (1).

4. A cooling unit as defined in one of the preceding claims, wherein walls of said lines (3) of said absorber (1) are provided with grooves (5, 6).

5. A cooling unit as defined in claim 4, wherein grooves (5, 6) are provided for which extend in two different directions and said grooves (5, 6) extending in different directions intersect respectively.

6. A cooling unit as defined in one of claims 1–3, wherein a reservoir (17) is formed in a lower section of said absorber integrally therewith.

7. A cooling unit as defined in one of claims 1–3, wherein said absorber (1) and said condenser (2) together are integrally built out of at least two plates.

8. A cooling unit as defined in one of claims 1–3, wherein said condenser (2) is built as serpentine condenser with liquid separator (9).

9. A cooling unit as defined in claim 8, wherein said condenser (2) comprises a first channel (7) guided in meander pattern, whose turns are formed essentially vertically and a second channel (8) located below said first channel (7), a plurality of connections (9) being provided between said first and said second channels.

10. A cooling unit as defined in claim 9, wherein on one end of said first channel a port (10) for a gaseous medium is provided for and wherein vertical extension of the turns of said first channel increases in a direction toward the other end of said first channel.

11. A cooling unit as defined in claim 10, wherein said second channel is formed extending in oblique downward direction to horizon starting with the end on which said first channel (7) has said port (10) for said gaseous medium.

12. A cooling unit as defined in one of claims 1–3, wherein said evaporator (22) whose lines are connected essentially perpendicularly to the plate plane of said absorber (1) is provided for between said condenser (2) and said absorber (1).

13. A cooling unit as defined in one of claims 1–3, wherein said generator (19) is provided for between said absorber (1) and said condenser (2) and wherein said generator (19) and said evaporator (12) are arranged on two opposing sides of said absorber (1).

14. A cooling unit as defined in claim 7, wherein said two plates of said absorber (1) and said condenser (2) are welded to one another.

15. A cooling unit as defined in claim 2, wherein an opening (4) to the adjacent line (3) is provided for in a deepest position of a v-shaped section in said line (3) of said absorber (1).

* * * * *